United States Patent
Al-Khoury

(10) Patent No.: US 10,234,040 B2
(45) Date of Patent: Mar. 19, 2019

(54) BUTTERFLY VALVE WITH IMPROVED SEAT RING PROVIDING INSTANT VALVE CLOSING AND UNIFORMLY INCREASING SEALING

(71) Applicant: Rami Al-Khoury, Dubai (AE)

(72) Inventor: Rami Al-Khoury, Dubai (AE)

(73) Assignee: Rami Al-Khoury (AE)

( * ) Notice: Subject to any disclaimer, the term of this patent is extended or adjusted under 35 U.S.C. 154(b) by 0 days.

(21) Appl. No.: 15/564,640

(22) PCT Filed: Apr. 9, 2015

(86) PCT No.: PCT/HR2015/000010
§ 371 (c)(1),
(2) Date: Oct. 5, 2017

(87) PCT Pub. No.: WO2016/162705
PCT Pub. Date: Oct. 13, 2016

(65) Prior Publication Data
US 2018/0080566 A1    Mar. 22, 2018

(51) Int. Cl.
*F16K 1/226* (2006.01)
*F16K 1/22* (2006.01)
*F16K 27/02* (2006.01)

(52) U.S. Cl.
CPC ............ *F16K 1/2263* (2013.01); *F16K 1/222* (2013.01); *F16K 1/2265* (2013.01); *F16K 27/02* (2013.01)

(58) Field of Classification Search
CPC ........ F16K 1/2263; F16K 1/222; F16K 27/02; F16K 1/226
USPC .......................................... 251/306, 305, 314
See application file for complete search history.

(56) References Cited

U.S. PATENT DOCUMENTS 4,605,201 A   8/1986   Miyazaki
5,741,006 A   4/1998   Murai et al.

FOREIGN PATENT DOCUMENTS

| | | |
|---|---|---|
| DE | 2650644 A1 | 5/1978 |
| EP | 0018220 A1 | 10/1980 |
| JP | H1078143 A | 3/1998 |
| JP | 2003014139 A | 1/2003 |

*Primary Examiner* — Kevin Murphy
*Assistant Examiner* — Kelsey Cary
(74) *Attorney, Agent, or Firm* — St Onge Steward Johnston and Reens LLC

(57) ABSTRACT

A seat ring for a butterfly valve provided at an inner circumferential surface of a valve body so as to create a seal between the inner circumferential surface of a valve body and the valve disc when closing the valve, and a sealing projection continuously protruding inwardly provided between a pair of bosses formed around a pair of opposite valve stem holes for inserting valve stems positioned radially outwardly of a flow passage direction. The sealing projection consists of a contact surface and an adjacent semi-elliptic surface, wherein the contact line of the contact surface and top portion of the adjacent semi-elliptic surface is a semi-elliptic edge displaced by an offset "h" from a plane defined by a vertical valve centerline and a transversal valve centerline in disc closing direction.

12 Claims, 8 Drawing Sheets

BUTTERFLY VALVE WITH IMPROVED SEAT RING PROVIDING INSTANT VALVE CLOSING AND UNIFORMLY INCREASING SEALING

FIELD OF THE INVENTION

The present invention relates to a butterfly valve, more particularly to improvements in the sealing structure of a butterfly valve seat ring wherein a valve disc provided in a valve body is rotated about a valve axis in order to, open and close a valve, and control a fluid flow through the butterfly valve.

PRIOR ART

In a butterfly valve, a valve disc of a substantially disc-like shape provided in a valve body is rotated about a valve axis, which passes through in the diametric direction of the valve disc, in order to open and close a valve, and control a fluid flow through the butterfly valve. At an inner circumferential surface of the valve body is provided with a seat ring made of a rubber elastic body. When the valve is closed, the valve disc is rotated about the valve axis in the direction of the closed position at which a disc surface is positioned perpendicular to the direction of fluid-flow and a circumferential edge portion of the disc makes a pressurized contact with the seat ring to create a seal between the inner circumferential surface of the valve body and the valve disc.

JP 3045671 B2 discloses a pair of valve stem insertion holes 11 drilled through an annular seat ring 10 attached to the internal surface of a hollow cylindrical body 30 of rigid material, and boss parts 12 formed around the holes 11, so as to keep a valve element in forced contact therewith at all times. In addition, a conical-head seat part is circumferentially and continuously formed between the pair of boss parts 12, so that the valve element, when closed, is forcibly kept in contact therewith. The conical-head seat part is formed out of the first conical-head seat part 13, and the second conical-head seat part 14 enlarged to the same shape (analogous shape), so that the bases 13a and 14a of respective parts 13 and 14 are in parallel with each other for substantiating the sealing function and mechanical strength. The geometry of the conical-head seat part during complete closure of the disc, when the surface of the disc perpendicular to the flow of media through the pipeline, requires a significant amount of seat ring material to be compressed, which requires a large force, i.e. high torque drive, to close the valve>Use of high torque actuators results in a higher price for the total operating valve (valve with actuator). Additionally, the higher rotational torque required to close the butterfly valve can result in damage to the seat ring; material tearing is greater and more rapid thus resulting in decreased service life. The compression of the conical-head seat part during complete closure of the disc results in compression of a significant amount of seat ring material and creates enormous stresses in the seat ring. The resulting stresses lead to accelerated aging of seat ring material and rapid valve leak. Due to the geometry of the first conical-head seat part surface especially in vicinity of the stems where the inclination of said surface is steep, the disc will create extreme tension in area, causing damage to the seat ring while repetitive closing of the valve. The sealing ability of the valve is rapidly decreasing, and thus overall efficiency of the valve.

U.S. Pat. No. 4,605,201 discloses a butterfly valve of the type including a valve casing, a seat ring provided in the valve casing and a valve disc rotatably provided in the valve casing. The butterfly valve further includes a pair of semi-circular sealing projections formed on the seat ring. The sealing projections are arranged and configured such that one sealing projection engages with one side of the valve disc while another sealing projection engages with another side of the valve disc. The object of the disclosed invention is to provide a butterfly valve wherein the circumference of the valve does not press into the inner surface of the seat ring when the valve is in the closed position. However, the valve disclosed in document U.S. Pat. No. 4,605,201 is not able to accomplish a uniform increase in sealing effect when rotating the disc in the closing direction since the angular displacement of all points around the circumference of the disc is not the same i.e. if the disc rotates by one degree the point furthest from both stems will displace the most and points closest to stems will displace the least.

AU771488B2 discloses a gradually varying inclination of a pressure contact surface 28 of the protrusion 26, whereby the pressure contact surface 28 in the vicinity of a valve stem 3 is sharply inclined, and the surface 28 far from the valve stem 3 is gently inclined. The abutting portion 31 of the pressure contact surface 28 abutting on the peripheral portion of the valve element 2 is expanded to an opening direction side more in a portion far from the valve stem 3 than in the vicinity of the valve stem 3. The peripheral portion of the valve element 2 almost simultaneously abuts on an abutting portions of protrusions 26 of the peripheral portion of the valve element 2. The valve disclosed in AU771488B2 has several shortcomings. As shown in FIG. 4 thereof, the junction of the inclined contact surface 28 and top portion 27 in cross-section is projected as a vertical line which coincides with the plane passing through seat ring centerline. Such a geometry, requires significant amount of seat ring material to be compressed to close the valve disc, which requires a large force, i.e. high torque drive is necessary, and eventually high torque actuators resulting with the higher price of the total operating valve (valve with actuator). A consequence of such a compression is enormous stresses in the seat ring, particularly in the vicinity of the stem holes, which leads to accelerated aging of seat ring material and rapid valve leak. Due to the very steep inclination of contact surface 28 near the stem holes and the way that the disc comes into contact and compresses the contact surface 28, and due to the junction of the contact surface 28 and top portion 27, which coincides with the plane passing through seat ring centerline, the stresses in the vicinity of stem holes will be the highest and those away from the stem holes in seat ring central portion the lowest, which means that design disclosed in document AU771488B2 is not able to accomplish uniform sealing along the entire circumference of the valve disc nor uniform increase in seal effect when rotating the disc in closing direction. Another shortcoming of such design relates to the very steep inclination of contact surface 28 in vicinity of the stem holes which is provided in an attempt to achieve almost simultaneous contact between the disc and the seat ring, and the junction of the contact surface 28 and top portion 27 which coincides with the plane passing through seat ring centerline. Referring to the FIG. 6, the disc will create extreme tension in the area surrounding the right line of contact surface 28 i.e. in the area around the line connecting the contact surface 28 with right flat surface, causing damage to the seat ring during repetitive closing of the valve. The only way to reduce this negative effect is to start closing the valve earlier, i.e. to make first sealing contact between disc and seat ring at a closing angle far from completely closed position. In such case, seat ring deformation caused by disc penetration and compression will be achieved prior to obtaining a completely closed position, resulting in much more elliptic-like shape of surface 26 thus creating smaller cross section surface of the valve opening. The smaller cross section surface means decreased medium flow resulting in decreased flow factor Kv, and increased drag resulting in increased pressure drop on valve i.e. worse coefficient Cd.

Document U.S. Pat. No. 5,741,006A discloses a butterfly valve that includes a valve member which provides improved sealing properties together with a seating ring. An inside projecting ridge 35 makes contact with the valve member 28 so as to block the fluid flow. The inside projecting ridge 35 includes vane-contact portions 41a and 41b and shaft supporting portion 33. The vane-contact portions 41a and 41b respectively come into pressure-contact with front and rear circumferential edges 39 and 40 of the vane 37 and 38 of the valve member 28. The shaft supporting portion 33 presses against the end surface of a shaft receptacle 50 of the valve member 28 in the radial direction of the valve member 28. Further, portions of the circumferential edges 39 and 40 which come into pressure-contact with the pressure-contact sealing surfaces 43 and 44 of the seating ring 23 are formed flat. The vanes of the valve member 28 are located at point-symmetrical positions centered on the shaft receptacles and extended tangentially with respect to the front and back circumferential surfaces of the shaft receptacles. In Document U.S. Pat. No. 5,741,006A features of a seating ring 23 are designed in dependence on the features of the valve member 28, where the valve member 28 is roughly a disc-form element with a radius of R with vanes extending tangentially with respect to the front and back circumferential surfaces of the shaft receptacles.

As these prior art patents demonstrate, it is common to provide a valve seat ring formed of resilient material within the flow passage to improve the sealing function. Notwithstanding the use of such seat rings, leakage problems, high torque actuators are still necessary to operate the valve, compression of the significant amount of seat ring material during complete closure of the disc resulting in enormous stresses in the seat ring, ripping, shredding and rapid degradation of seat rings particularly near the stem, with loss of physical properties resulting in decrease of sealing effectively are still present in many butterfly valves.

SUMMARY OF THE INVENTION

An object of the present invention is to provide a butterfly valve seat ring wherein a periphery of a valve disc, along the entire circumference of the valve disc, is entirely and substantially at the same instant brought into contact with a semi-elliptic first contact/closure curve of the seat ring resulting in instantaneous valve closing. Furthermore, an object of the present invention is to provide the butterfly valve seat ring wherein the sealing projection is of variable cross section shape and contact surface is formed as tapered surface displaced by offset "h" from plane defined by vertical and transversal valve centerline (both perpendicular to the flow direction) in the valve closing direction.

The present invention provides a seat ring for a butterfly valve comprising a valve disc substantially of a disc-like shape, where the seat ring includes a sealing projection continuously protruding inwardly in the circumferential direction between a pair of bosses, the bosses are positioned radially outwardly of a flow passage direction, where the sealing projection constitutes curved swelling surfaces consisting of a contact surface and an adjacent semi-elliptic surface, wherein the semi-elliptic surface is formed parallel to the flow passage direction with its smallest inner diameter smaller than that of the valve disc, and the contact surface is formed as a tapered surface; wherein a semi-elliptic first contact/closure curve of the contact surface forms a line inclined towards valve disc opening direction at the central portion between the bosses, wherein the connection of the contact surface and of the adjacent semi-elliptic surface is semi-elliptic edge displaced by offset "h" from plane defined by vertical valve centerline and transversal valve centerline in the valve closing direction. The sealing projection has variable cross section shape, wherein the contact surface is formed as tapered surface with a slant varying in the circumferential direction in such a manner that the slant is steep in the vicinity of the bosses and gentle in the central portion between the bosses, where said slant is extending from the semi-elliptic first contact/closure curve to the semi-elliptic edge. Such design enables a periphery of the valve disc to entirely and substantially at the same instant come into contact with semi-elliptic first contact/closure curve, resulting in uniform penetration of valve disc into seat ring and thus uniform sealing along the disc circumference. It also provides low grinding/clamping of sensitive media e.g. granules between the valve disc and seat ring. Instantaneous valve closing together with fluid flow rate control, by adjusting the rotation angle of the valve disc, enable the valve to be used as flow control valve until the very first closed position. Further advantage of such valve seat design provides, at different fluid pressure, closing of the valve at different degrees i.e. minimal disc—seat ring deformation to oppose certain pressure. Therefore smaller actuator for closing the valve at lower pressure in the pipeline is required.

BRIEF DESCRIPTION OF THE DRAWINGS

Other features and objects of the present invention will become apparent from the following description made with reference to the accompanying drawings, in which.

DETAILED DESCRIPTION OF THE EMBODIMENTS

Figure 1:
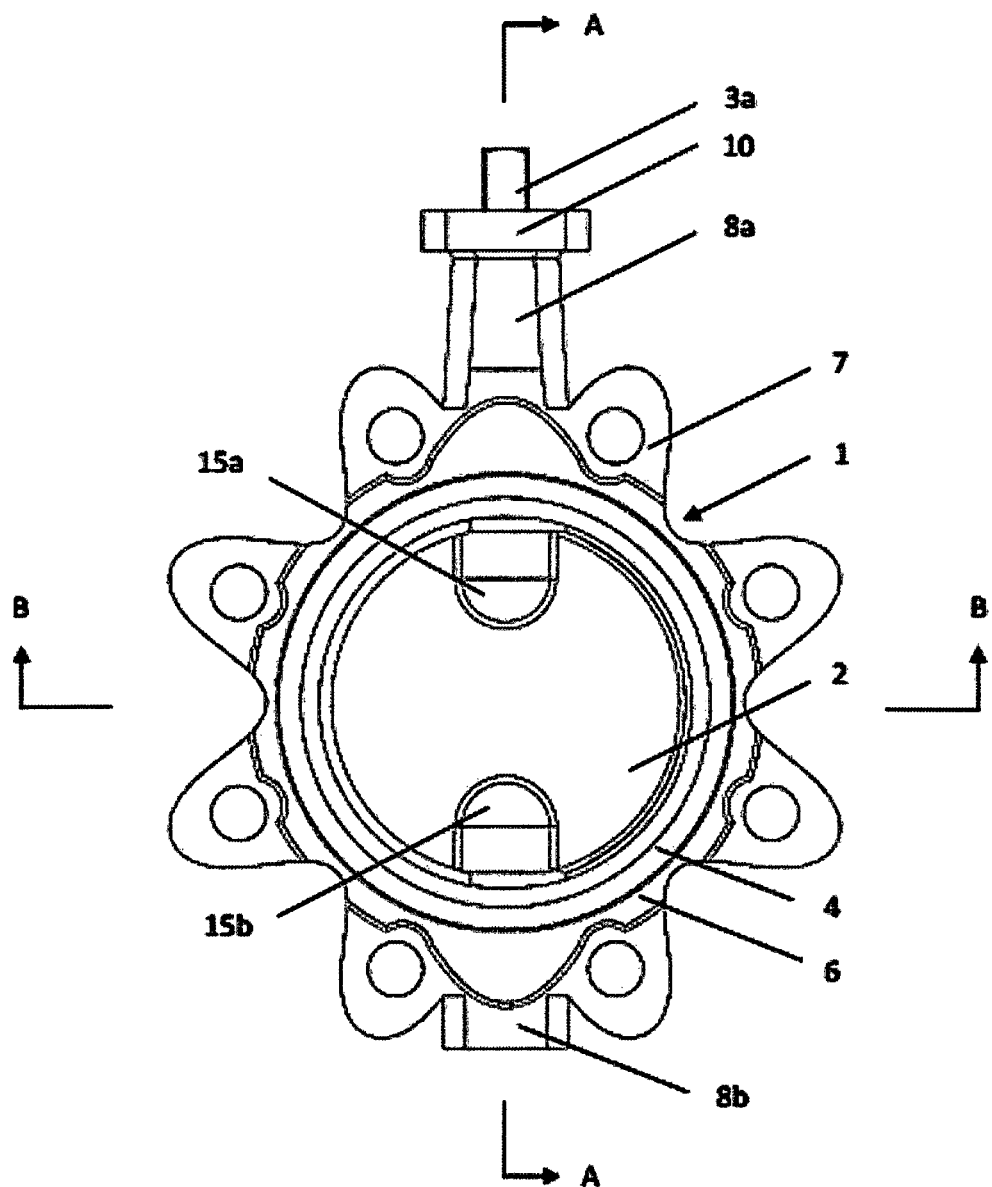
FIG. 1 is a front elevation view of a butterfly valve according to the present invention.
Figure 2:
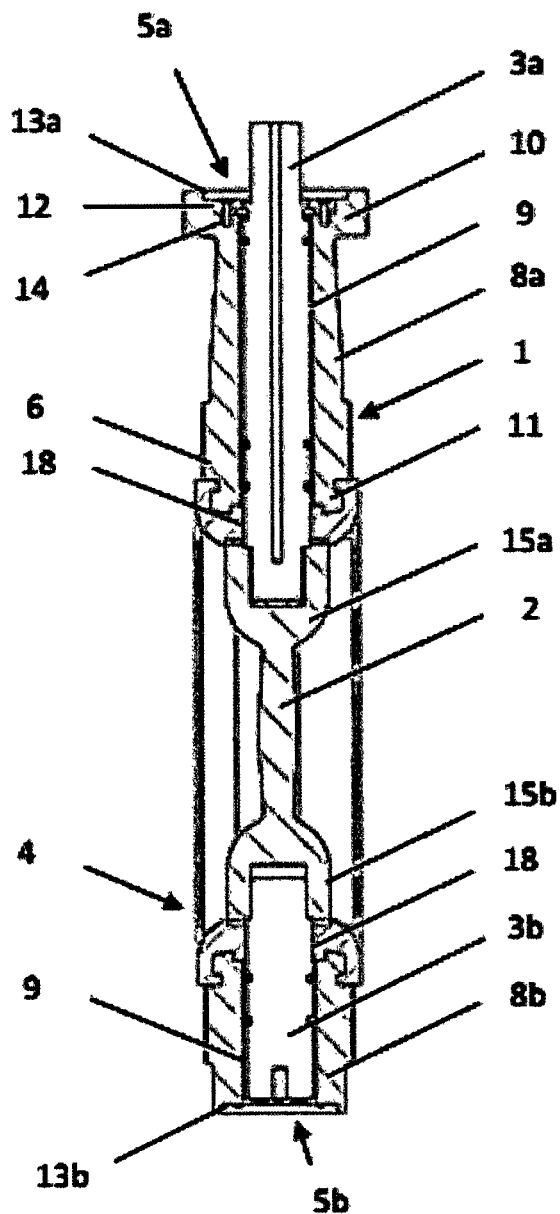
FIG. 2 is a vertical cross section of a butterfly valve taken along the line A-A of FIG. 1.
Figure 3:
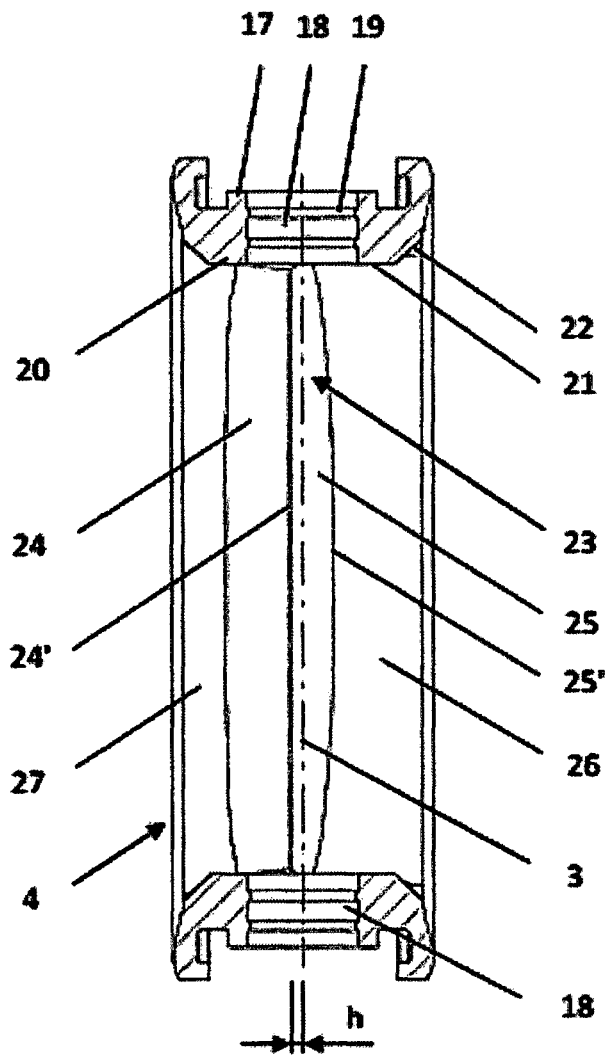
FIG. 3 is a vertical cross section illustrating the seat ring of the butterfly valve of FIG. 1 taken along the line A-A of FIG. 1.

Preferred embodiments of the present invention will be explained in detail below with reference to the accompanying drawings. A butterfly valve according to the present invention is disposed at a joint portion between two pipes through which a fluid flows, and adapted to open and close the flow passage and besides to control the fluid flow rate. Referring to FIGS. 1 to 3 butterfly valve in accordance with the present invention comprises an annular valve body 1 tightly sandwiched between said two pipes in the axial direction (flow passage direction), a valve disc 2 substantially of a disc-like shape disposed inside the valve body 1, valve stems 3a and 3b rotatable supporting the valve disc 2 around a valve axis 3 (an axis passing through the center of the valve body 1 and perpendicular to the flow passage), seat ring 4 provided at an inner periphery of a valve body 1 to make a seal between the inner periphery of a valve body 1 and the valve disc 2, and slipping out prevention means 5a and 5b to prevent valve stems 3a and 3b from slipping out from body necks 8a and 8b. The valve body 1 is made of, for example, ductile cast iron and comprises a tubular casing body 6 tightly sandwiched between two pipes in the flow passage direction, flange 7 to fit and connect the valve into pipeline, necks 8a and 8b to place in the shafts 3a and 3b, circular stem holes 9 being drilled to insert the stems 3a and 3b, connection plate 10 located on top of neck 8a to fit the actuator for operating the valve. Tubular casing body 6 comprises a circular protrusion 11 being formed continuously in the inner circumferential surface of the tubular casing body 6, and two circular grooves being formed continuously from stem hole 9 to other stem hole 9 in the inner circumferential surface of the circular protrusion 11 and a slippage prevention means 16, shown in FIGS. 4 and 5, of the seat ring 4 is fitted therein. A circular grove is formed around axis 3 in stem holes 9 in the inner circumferential surface of said protrusion 11 and a slippage prevention means 17 of the seat ring 4 is fitted therein. Said grooves and fitted slippage prevention means 16 and 17 are provided to prevent a deviation of the seat ring 4 in the flow passage direction and its rotation around axis 3 while opening and closing the disc 2. Valve necks 8a and 8b are provided at the valve body 1 radially outwardly in the direction of the valve axis 3 and respective stem holes 9 are drilled through, through stem holes 9 valve stems 3a and 3b are inserted. The connection plate 10 with holes for screws to fit the actuator for operating the valve is located on top of the body neck 8a. In case of Wafer valve type, flange 7 to fit and connect the valve accurately between two pipes into pipeline comprises drilled holes through which threaded rods are inserted and valve is tighten into pipeline. With Lug valve type, thread is machined into flange so the bolts are inserted and used to tighten the valve accurately between two pipes into pipeline. Flange 7 is casted blind and drilled or machined afterwards, according to requested standard. In connection plate 10 on top of body neck 8a and in the outer end of body neck 8b are provided slipping out prevention means 5a and 5b to prevent valve stems 3a and 3b from slipping out from body necks. Top prevention means 5a comprises two half-plates 12 put together into circumferential groove positioned near the upper end of the stem 3a, to restrain stem axial movement and enable its fallout from the neck 8a, inserted together into stem hole 9, covered by cover plate 13a to lock it in place, fastened with four screws 14 to the body neck 8a. Bottom prevention means 5b comprise only cover plate 13b, to restrain stem 3b axial movement and its falling out from neck 8b, fastened in place with four screws like those 14 used on the top but which cannot be seen in cross section shown in FIG. 2. Both prevention means are designed to use O-rings to prevent leakage i.e. to prevent medium going out from the valve through stem holes 9. The valve disc 2 is of substantially a disc-like shape formed of, for example, stainless steel and has a diameter smaller than an inner diameter of the annular protrusion of the valve body 1. The valve disc 2 is disposed inside the valve body 1 by arranging its diametrical direction in conformity with the valve axis 3. By rotating said valve disc 2 about the valve axis 3, when its plate face is made parallel to the direction of fluid flow, the flow passage is opened, and when the plate face is made perpendicular to the direction of fluid flow, the valve is in fully closed position. By adjusting the rotation angle of the valve disc 2, the fluid flow rate is controlled subject to rotation angle. Instantaneous valve closing, when the periphery of a valve disc 2 along the entire circumference of the valve disc 2 entirely and substantially at the same instant comes into contact with a semi-elliptic first contact/closure curve 25' of the seat ring 4, together with fluid flow rate control, by adjusting the rotation angle of the valve disc 2, enable the valve to be used as flow control valve until the very first closed position. Present invention provides low grinding/clamping of sensitive media e.g. granules between the valve disc 2 and seat ring 4. At opposite positions in the direction of the valve axis 3 of the valve disc 2 are provided stem fitting portions 15a and 15b in which end portions of the valve stems 3a and 3b are closely fitted respectively to support the valve disc 2 inside the valve body 1. A fitting hole of the stem fitting portion 15a is substantially of square in a cross section while a fitting hole of the stem fitting portion 15b is substantially of circular cross section. The valve stem 3a is made of, for example, duplex stainless steel and is of bar-like shape having a circular cross section and inserted into the stem hole 9 of body neck 8a. The upper end of the valve stem 3a extending outwardly of the body neck 8a is formed substantially in a square shape in cross section for engagement with an operating handle or actuator not illustrated to rotate the valve stem 3a about the valve axis 3. The lower end of the valve stem 3a extending to the inside of the valve body 1 is formed substantially in a square shape in cross section for engagement with the fitting hole of the stem fitting portion 15a and the valve disc 2 can be rotated about the valve axis 3 when the valve stem 3a is rotated about the valve axis by handle or actuator. A circular cross sectional portion of the valve stem 3a positioned near the upper end of the body neck 8a is provided with a circumferential groove in which the inner periphery of two half plates 12, locked from above with fastened cover plate 13a, are fitted and the valve stem 3a is prevented from slipping out. The valve stem 3b is made of, for example, duplex stainless steel and is of bar-like shape having a circular cross section and inserted in the body neck 8b. The upper end of the valve stem 3b extends to the inside of the valve body 1 so as to be fitted in the circular fitting hole of the stem fitting portion 15b, thereby supporting the valve disc 2 rotatably about the valve axis 3. The axially outer end of the valve stem 3b is prevented from axially outward movement by the cover plate 13b fastened to the body neck 8b with screws. The connection between both valve stems 3a and 3b and body necks 8a and 8b is made through bearings which take and transfer the load from the valve stems to the body, and contribute to friction reduced stem rotation. In contact area between stems and bearings sealing is performed by o-rings inserted into stem grooves. In present embodiment, as shown in FIG. 2, valve stem 3a is supported by two bearings positioned on opposite sides of the stem, and valve stem 3b is supported by one bearing only. Number and size of bearings as well as number of o-rings per bearing vary with the valve size, pipeline nominal pressure, medium, etc.

Figure 4:
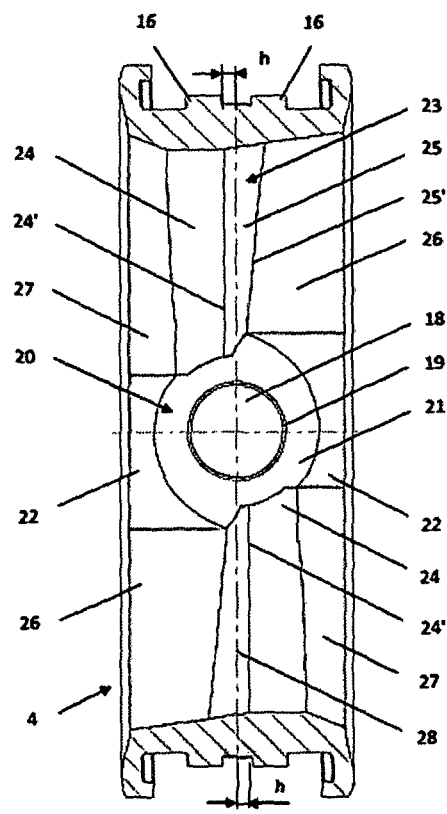
FIG. 4 is a transverse sectional view illustrating the seat ring of FIG. 3 taken along the line B-B of FIG. 1.
Figure 5:
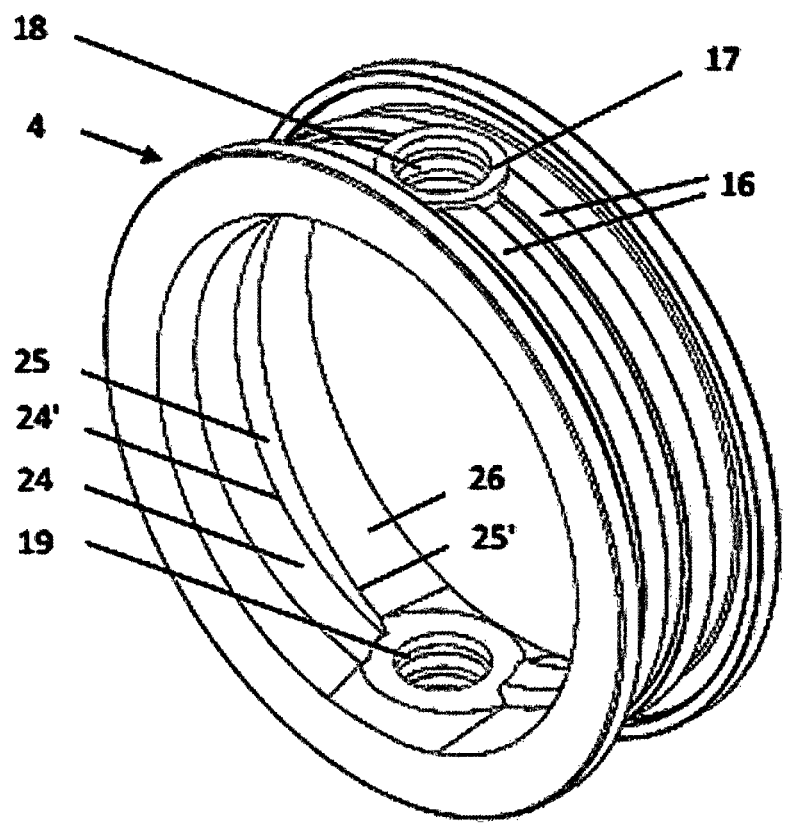
FIG. 5 is an isometric view illustrating a seat ring of a butterfly valve according to the present invention.

FIGS. 3 to 5 illustrate seat ring 4. The seat ring 4 is formed of rubber elastic body and has an outside face opened radially outwardly and is of a ring-like shape having two circular bosses 16 fitted into two matching grooves in body circular protrusion 11. A circular boss 17 is formed around axis 3 on the outer circumferential surface of seat ring 4 and fitted into a circular groove formed around axis 3 in stem holes 9 in the inner circumferential surface of said protrusion 11. The outer side of the seat ring 4 is bent inwardly to embrace the protrusion 11 and attached to the inner circumferential surface of the valve body 1. The outer diameter of the seat ring 4 is adjusted to the size of the valve and to fit in the valve body 1, and its inner diameter is larger than the diameter of the valve disc 2 in order to provide sealing. Said circular bosses 16 and 17 are slippage prevention means, and with outer sides of the seat ring 4 bent inwardly to embrace the protrusion 11, prevent deviation of the seat ring 4 in the flow passage direction and its rotation around axis 3 while opening and closing the valve disc 2. As shown in FIGS. 2, 3 and 5, provided at opposite positions of the seat ring 4 radially outward of the flow passage in the direction of the valve axis 3 are a pair of circularly shaped stem holes 18 made in seat ring through which the valve stems 3a and 3b are inserted. Two parallelly arranged circular lips 19 located on the inner periphery of each stem hole 18 exactly follow the geometry of the hole thus achieving increased sealing with decreased torque necessary to operate the valve. These two lips 19 in contact with the stem create chambers that prevent outflow of medium from the pipeline through the stem opening.

A pair of bosses 20 are formed protruding inwardly around the valve stem holes 18 to make a seal with the fitting portions 15 of the valve disc 2 positioned near to the vertical valve axis 3. Said boss 20 consist of a flat sliding surface 21 on which the flat radially outward portion of the stem fitting portions 15a i.e. 15b of the valve disc 2 slides and a curved/inclined surface 22 extending from the edge of said flat sliding surface 21 to the edge of the seat ring 4. The form of slide surface 21 is defined by several parameters, such as disc diameter, closing angle where the valve disc 2 touches the semi-elliptic first contact/closure curve 25' for the first time, sealing tightness between the valve disc and seat ring.

Between a pair of bosses 20, there is provided a sealing projection 23 continuously protruding inwardly in the circumferential direction. The sealing projection 23 is arranged and configured such that one sealing projection engages with one side of the valve disc 2 while another sealing projection engages with another side of the valve disc 2. More particularly, sealing projection 23 constitutes curved swelling surfaces consisting of contact surface 25 and adjacent semi-elliptic surface 24. According to the present invention the semi-elliptic edge 24' of the adjacent semi-elliptic surface 24 is displaced by offset "h" from the plane defined by vertical valve centerline 3 and the transversal valve centerline 28 in valve closing direction. Referring to FIGS. 3 and 4, offset "h" at the top portion of the semi-elliptic edge 24' is shifted in the valve closing direction from the transverse centerline 28, wherein the offset "h" amounts at least half of the disc periphery thickness. When the valve disc 2 is in fully closed position, the semi-elliptic edge 24' is closely contacting with periphery of the valve disc 2 along the entire circumference of the valve disc (2).

The contact surface 25 has semi-elliptic first contact/closure curve 25' closely contacting with the valve disc 2 in very first closed position of the valve—when the disc touches the sealing projection 23 for the first time thus making not-strong but uniform sealing along the entire circumference of the valve disc. Between semi-elliptic first contact/closure curve 25' and right seat ring edge (FIGS. 3 and 4) sloping circular surface 26 is arranged. The semi-elliptic surface 24 is formed parallel to the flow passage and, due to the sealing functionality, its smallest inner diameter is smaller than that of the valve disc 2. In comparison to circular cross section with the same sealing effect, semi-elliptic surface 24 provides larger cross section surface of the valve opening which means increased medium flow resulting in increased flow factor Kv, and decreased drag resulting in decreased pressure drop on the valve i.e. better coefficient Cd. Surface 27 is arranged in continuation of the semi-elliptic surface 24 to the left seat ring 4 edge (FIGS. 3 and 4). The contact surface 25 is formed as an inclined face (tapered face) slanting from the semi-elliptic edge 24' of the semi-elliptic surface 24 towards the semi-elliptic first contact/closure curve 25' of the seat ring 4, where the slant is varying in the circumferential direction in such a manner that the slant is steep in the vicinity of the bosses 20, and gentle in the central portion between the bosses 20. When observed from the valve axis 3, the semi-elliptic first contact/closure curve 25' forms a line inclined towards disc opening direction at the central portion between the bosses 20. The contact line between contact surface 25 and top portion of the semi-elliptic surface 24 is semi-elliptic edge 24' and is shifted by offset "h" from plane defined by vertical valve centerline 3 and transversal valve centerline 28. The value of offset "h" amounts at least half of the disc periphery thickness as shown in FIG. 3. As aforesaid, according to the prior art solutions, in the area near the stems valve disc does not penetrate into the seat ring but compresses it. When closing the disc, degree by degree, the disc presses seat ring with inner periphery of the disc surface, not with its peripheral edge, deforming it and thus creating the force between the disc and seat ring opposing the pressure of the medium in the pipe and sealing is achieved. The force of penetration and compression force acting on seat ring are not the same. In order that disc extrudes the same amount of seat ring material, i.e. to shift of the seat ring in tensioned state compared to unstrained state, it is required far greater force to compress the seat ring material than that to penetrate into it. This means that the force for making uniform seal along the entire circumference of the valve disc will be the greatest in areas close to stem holes. For example, if the thickness of disc periphery is 6 mm, 3 mm of seat ring material near the stem holes should be compressed which demands high "compression" force and results in increase in required actuator torque directly affecting the price of the total operating valve (valve with actuator). Increased tension leads to accelerated aging of seat ring material in vicinity of stem holes and rapid valve leaking. The sealing ability of the valve is rapidly decreasing, and thus the efficiency of the valve.

Furthermore, implementing offset "h" enables later contact between valve disc periphery and seat ring at the same time, which means that sealing starts at few deflection degrees of the valve disc from fully closed position. This achieves the maximum possible cross section of the valve openings allowing maximal flow of fluid through the valve, increased Kv value and reduced pressure drop Cd across the valve.

Figure 6A:
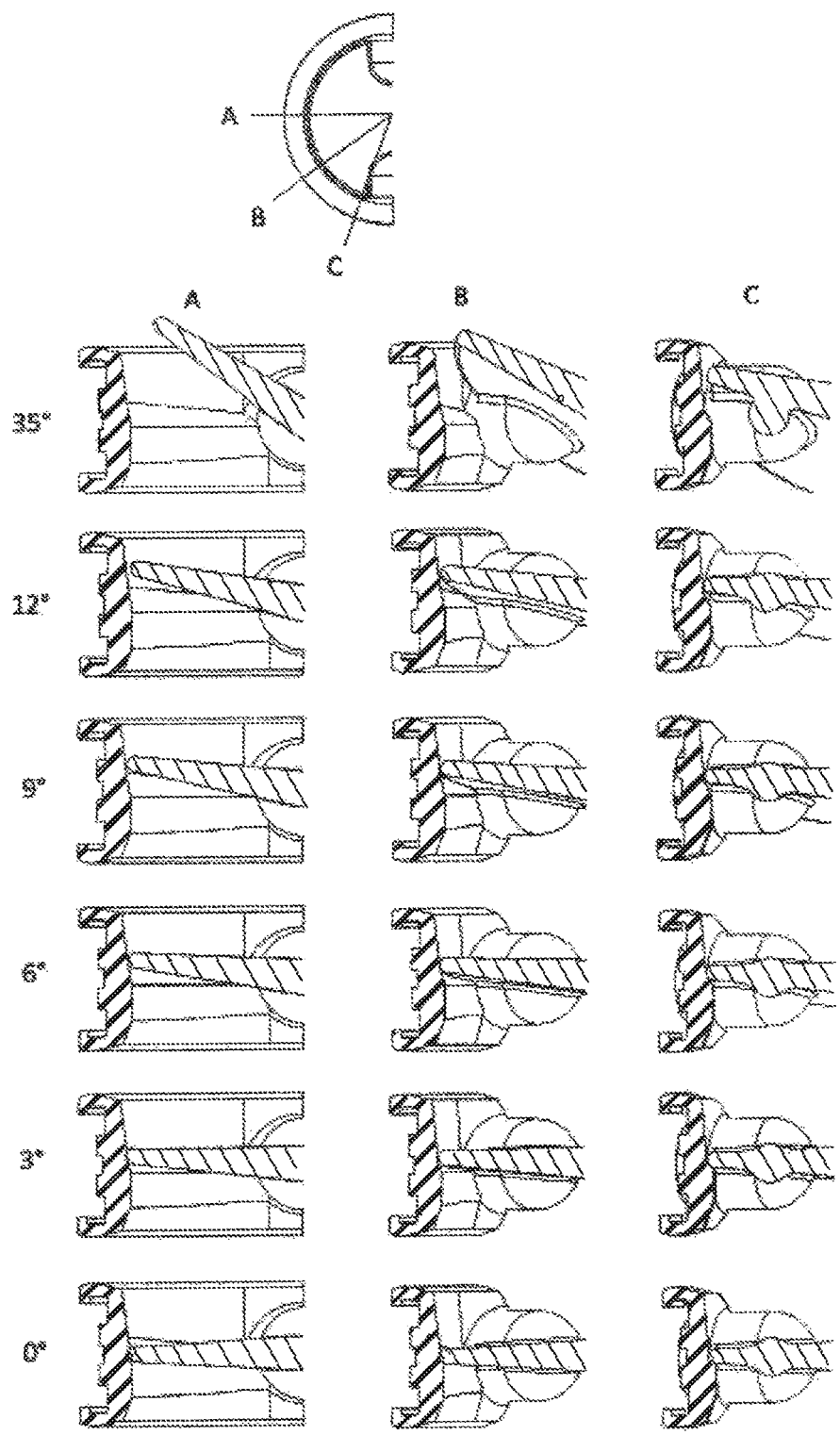
FIG. 6a is a partial sectional view illustrating phases of the disc closing onto the seat ring of the butterfly valve of the invention with Lines A, B, and C identifying the location of partial sectional views illustrated in Columns A, B, and C, the partial sectional views of Columns A, B, and C illustrating the interaction of the disc and seat ring with the disc positioned at 35°, 12°, 9°, 6°, 3° and 0° (closed)

The steps of sealing according to the present invention, between the sealing projection 23 of the seat ring 4 and the valve disc 2, will be explained with reference to the appended FIG. 6a. In FIG. 6a is shown interrelation between valve disc 2 and sealing projection 23 at 35°, 12°, 9°, 6°, 3° and 0° in sections A, B and C when the valve disc 2, in opened position, rotates about the valve axis 3 towards closing direction and shifts to fully closed position. Section A is made in central portion of the liner away from the bosses 20, section C in the vicinity of the boss 20, and section B between said sections A and C. At 35°, 12° and 9° the peripheral edge of the valve disc 2 is still not brought into contact with semi-elliptic first contact/closure curve 25' of the contact surface 25. In none of three sections (A, B, C) peripheral edge of the valve disc 2 is touching the seat ring 4. At angle 6° periphery of the valve disc, along the entire circumference of the valve disc 2, is entirely and substantially at the same instant brought into contact with the semi-elliptic first contact/closure curve 25' resulting in soft but instant closing. It is evident that at 6° the touch occurs simultaneously in all three sections A, B and C which proves the disc is along the entire circumference at the same instant brought into contact with the seat ring. At angles ranging from 6°-0° uniform seal along the entire circumference of the valve disc is present, the seal effect uniformly increases while rotating the disc in closing direction; up to fully closed position at 0° where the seal effect is maximal. By comparing all three sections (A, B, C) at angle 3° it can be seen the seal effect is equal in all sections which proves uniform seal along the entire circumference of the valve disc. Also, by comparing all three sections (A, B, C) at angle 0° one comes to same conclusion; the seal effect is uniform along the entire circumference of the valve disc. Furthermore, by comparing sections A, B and C at 3° with corresponding sections A, B and C at 0° it can be seen the seal effect increased at 0° which proves increase in sealing when rotating the valve disc in closing direction. Since the seal effect is the same in all three sections at certain angle and since the seal effect increases when rotating the disc in closing direction, it can be concluded the seal effect uniformly increases while rotating the disc in closing direction.

Figure 6B:
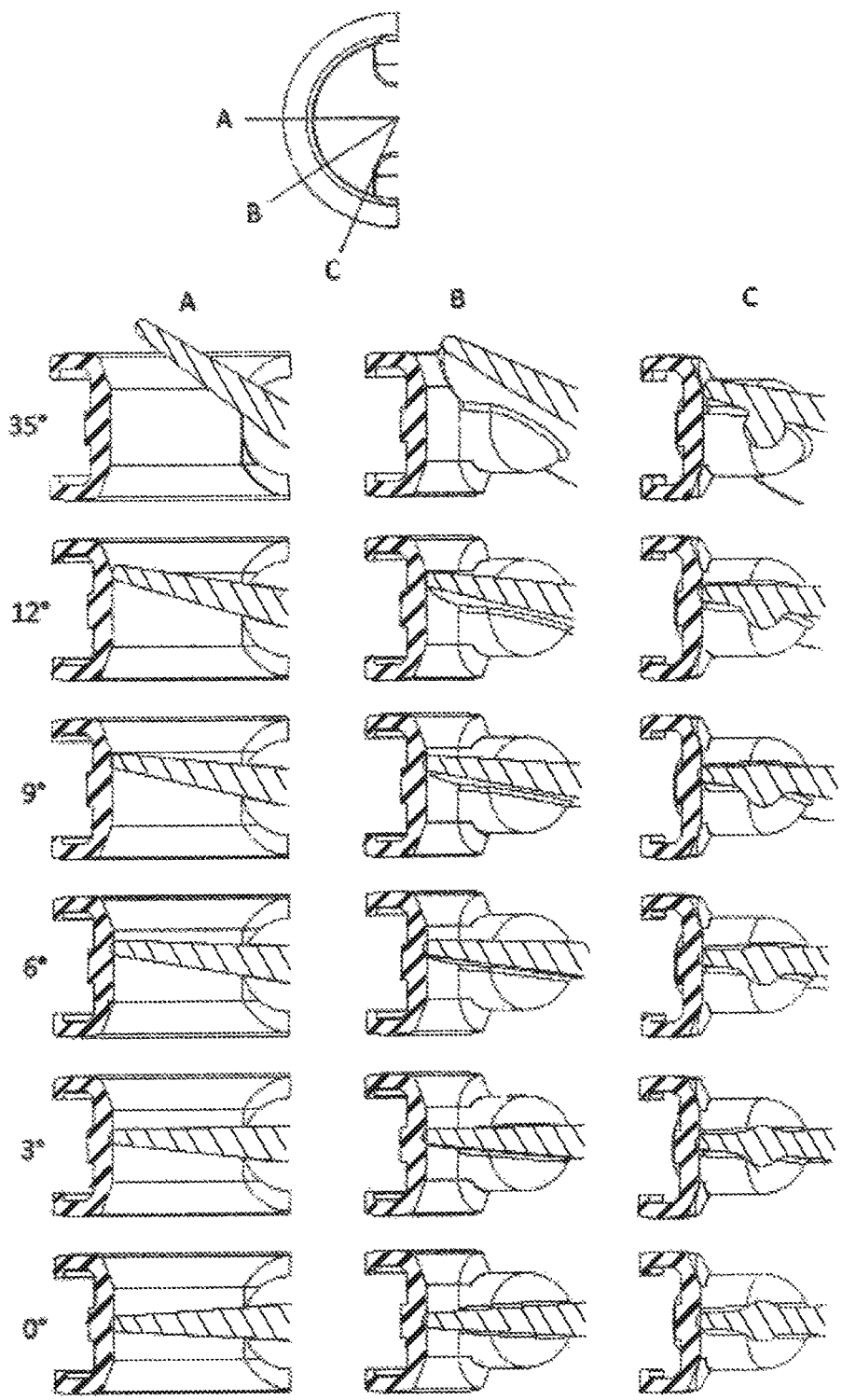
FIG. 6b is a partial sectional view of the disc closing onto the seat ring of a prior art butterfly valve with Lines A, B, and C identifying the location of partial sectional views illustrated in Columns A, B, and C, the partial sectional views of Columns A, B, and C illustrating the interaction of the disc and seat ring with the disc positioned at 35°, 12°, 9°, 6°, 3° and 0° (closed)

The steps of sealing of a prior art standard butterfly valve currently on the market, between the seat ring and valve disc, will be explained with reference to the appended FIG. 6b. In FIG. 6b is shown interrelation between valve disc and seat ring at 35°, 12°, 9°, 6°, 3° and 0° in sections A, B and C when the valve disc, in opened position, rotates towards closing direction and shifts to fully closed position. Section A is made in central portion of the liner away from the bosses, section C in the vicinity of the boss, and section B between said sections A and C. At 35° the peripheral edge of the valve disc comes into contact with seat ring for the first time, but only in section C; in area away from the bosses. In sections A and B the peripheral edge of the valve disc is not brought into contact with seat ring. At angles 35° to 13° the valve is only partially closed, i.e. the valve disc is not in contact with seat ring along its entire circumference and complete sealing is not accomplished. As the disc rotates from 35° towards 12° the contact between the seat ring and valve disc is progressing from the area near the bosses (section C) towards valve central portion (section A). At 12° the peripheral edge of the valve disc comes into contact with seat ring in section A for the first time thus creating seal along the entire circumference of the valve disc i.e. the valve is closed and seals for the first time. This sealing is not uniform along the entire circumference of the valve disc; the seal effect is the greatest in area near the bosses (section C) and gradually decreases towards the central portion away from the bosses (section A). As the disc rotates from 12° towards 1° the seal effect increases much faster in area away from the bosses (section A) than in area near the bosses (section C). The only position where the seal effect becomes uniform along the entire circumference of the valve disc is reached at 0° in disc fully closed position, which can be concluded by comparing sections A, B and C at 0°.

Figure 7A:
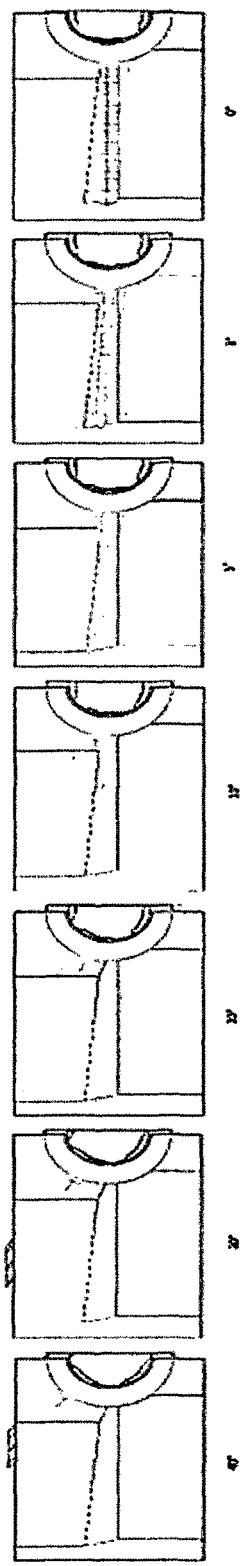
FIG. 7a is a top plan view of a sealing ring of the butterfly valve of the invention showing deformation of the seat ring arising from penetration of the disc into the seat ring as the disc is closed, showing, from left to right, the disc and seat ring with the disc positioned at 40°, 30°, 20°, 10°, 5°, 3°, and 0°.
Figure 7B:
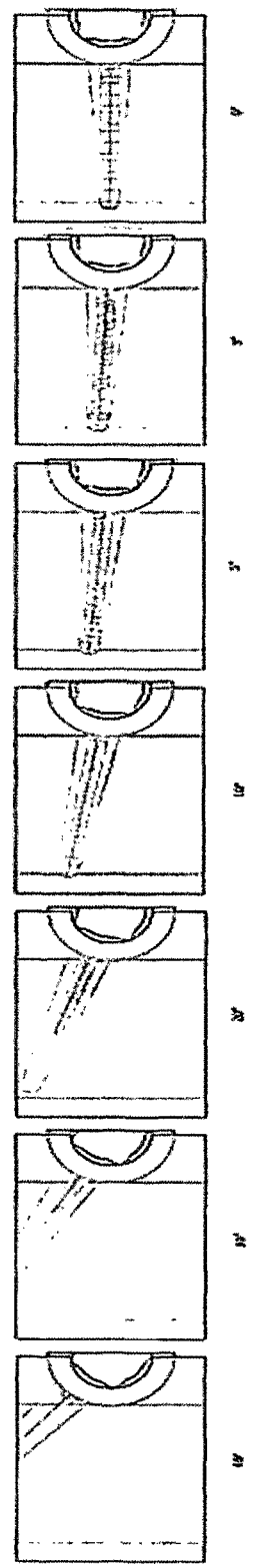
FIG. 7b is a top plan view of a sealing ring of a prior art butterfly valve showing deformation of the seat ring arising from penetration of the disc into the seat ring as the disc is closed, showing, from left to right, the disc and seat ring with the disc positioned at 40°, 30°, 20°, 10°, 5°, 3°, and 0°.

FIGS. 7a and 7b is illustrate comparison of penetration of disc into the seat ring while disc is shifting towards a closing direction between a butterfly valve seat ring according to the present invention (FIG. 7a) and a prior art standard butterfly valve currently on the market (FIG. 7b). It can be seen as according to the present invention penetration of disc into the seat ring starts between 10° and 5° (at 6° exactly in this shown case) while in prior art standard butterfly valve between 40° and 30°. Early contact between valve seat ring and periphery of the valve disc is resulting in accelerated tearing of seat ring material in vicinity of stem holes and rapid valve leak. Also, it can be seen as in prior art uniform penetration of disc into the seat ring is achieved only in fully closed position at 0°, while in all other positions seat ring deformation is greatest near the stems and decreases as moving away from stems. In FIG. 7b this is illustrated using three different line densities where more dense lines illustrate deeper penetration and less dense lines illustrate shallower penetration. According to the present invention, FIG. 7a, it can be seen that only one line density is used per closing angle; on 5° the less dense one and on 0° the denser one. This means that uniform seat ring deformation is always present, and as the disc is shifting towards fully closed position sealing force is getting greater.

Control of sealing taking into account real needs is crucial for achieving valve long service life. Uniform sealing along the contact surface of the valve disc periphery and seat ring enables optimum deformation of the seat ring and thus slows down its aging and increases the lifetime of the valve. For example, if the valve is mounted in the pipeline with 25 bar pressure, if necessary, valve will be completely closed resulting in maximal deformation of seat ring and the largest sealing force, which operates uniformly around the periphery of the disc, is opposing high pressure. If in the pipeline pressure is 16 bar, it will not be necessary to close valve disc fully, with small deflection from the fully closed position, where the seat ring deformation will be lower than in the first case, but sufficient for a perfect seal around the entire circumference of the valve disc and opposing said pressure. Deformation of the seat ring is optimal, dosed and aging of the seat ring will be slower, and life of the valve is increased. If the pressure in the pipeline is 10 bar, deflection of valve disc from fully closed position necessary to close will be even greater than at 16 bar. Using an electric actuator to close the valve, closing can be optimized through the closing momentum. This means that according to the manufacturer's specification for countering certain nominal pressure, user can set appropriate i.e. optimal momentum of closing the valve. During whole service life in pipeline under same nominal pressure the valve will be closing with same momentum each time, only the disc deflection will vary in dependence of the wear of the seat ring. As the seat ring is going to be more worn out, during time, closing of the valve will tend towards fully closed position (0° in FIG. 6a). The great advantage of this approach is optimal sealing regardless of the age of the valve, until the end of its life cycle. Hereby, not only the optimal sealing is provided, but also long life valve.

In prior art butterfly valves, inspections of the liner or seat ring was not possible without removing the valve from the pipeline. However, in the present invention, by using the principles described in the preceding paragraph, based on the dependence of the closing momentum of the valve and the angle of deflection of valve disc, inspection of the seat ring without removing the valve from the pipeline is possible. Specifically, it is possible for a user to determine the closing torque and the angle at which sealing is obtained (at different pressures and/or flow rates), and the user can determine a projected valve remaining service life i.e. about number of remaining open-close cycles. Information regarding the angle at which sealing at certain momentum is obtained for particular pressure in the pipeline, and data concerning number of remaining cycles are obtained by long-term testing of valves in various conditions and also given to the user by the manufacturer. In this way, the inspection on the basis of the imposed torque and deflection angle of the valve disc from the closed position becomes possible and applicable. A major advantage of such approach is that the inspection of valves can be performed under pressure, without removing the valve from the pipeline, and very precisely determine how many work cycles valve can still operate.

Accordingly, the present invention provides a seat ring for a butterfly valve provided at an inner circumferential surface of a valve body so as to create a seal between the inner circumferential surface of a valve body and the valve disc when closing the valve, and a sealing projection continuously protruding inwardly provided between a pair of bosses formed around a pair of opposite valve stem holes for inserting valve stems positioned radially outwardly of a flow passage direction. The sealing projection consists of contact surface and adjacent semi-elliptic surface, wherein the contact line of the contact surface and top portion of the adjacent semi-elliptic surface is semi-elliptic edge displaced by offset "h" from plane defined by vertical valve centerline and transversal valve centerline in disc closing direction, wherein offset "h" amounts at least half of the valve disc periphery thickness. The sealing projection is arranged and configured such that one sealing projection engages with one side of the valve disc while another sealing projection engages with another side of the valve disc. The contact surface curved swelling towards the periphery of the valve disc in disc opening direction is extending from semi-elliptic first contact/closure curve of the contact surface to semi-elliptic edge and is shaped as a straight line i.e. tapered surface formed with the slant varying in the circumferential direction in such a manner that the slant is steep in the vicinity of the bosses, and gentle in the central portion away from the bosses. Such design enables a periphery of the valve disc to entirely and substantially at the same instant come into contact with semi-elliptic first contact/closure curve, and uniform penetration of valve disc into seat ring thus uniform sealing along the disc circumference which uniformly increases while rotating the disc in closing direction. Instantaneous valve closing together with fluid flow rate control, by adjusting the rotation angle of the valve disc, enable the valve to be used as flow control valve until the very first closed position.

According to the present invention, as apparent from the above description, the circular projection of the seat ring can be brought into contact with the periphery of the valve disc substantially at the same time since the sealing projection is swelling towards the axial direction of the flow passage. As a result, there occurs no contact before the contact of the periphery of the valve disc with the circular projection is completed. Thus, useless torque not contributing to a sealing can be avoided. Also, when controlling the fluid flow rate by rotating the valve disc about the valve axis, the periphery of the valve disc around the valve axis is not brought into contact with the circular projection, so that the durability of the circular projection can be improved. In addition, by varying the slant of the contact face gradually, the contact height at the portion where the thrust deformation amount is small becomes large, and as a result, the cross section of the pushed out portion of the circular projection pressed by the periphery of the valve disc 2 at the time when closing a valve, is substantially equal in the circumferential direction, so that the sealing efficiency is substantially equal in the circumferential direction and useless contact is avoided.

The present invention also provides low grinding/clamping of sensitive media e.g. granules between the valve disc and seat ring.

It should be understood that the foregoing description is only illustrative of the invention. Various alternatives and modifications can be devised by those skilled in the art without departing from the invention. For example, the seat ring can be secured by vulcanization bonding.

The invention claimed is:

1. A seat ring for a butterfly valve having a valve disc, the seat ring having a radially inwardly protruding continuous circumferential sealing projection located between a pair of bosses surrounding valve stem holes, the sealing projection having a varying cross-sectional shape and comprising a contact surface and an adjacent semi-elliptic surface, wherein the semi-elliptic surface has a smallest inner diameter smaller than that of the valve disc, and the contact surface is a tapered surface;

wherein the contact surface comprises a semi-elliptic first contact/closure curve, the semi-elliptic first contact/closure curve being inclined towards a valve disc opening direction at a central portion between the pair of bosses and swelling away from a semi-elliptic edge connecting the contact surface and the adjacent semi-elliptic surface, wherein the semi-elliptic edge is positioned an offset distance from a plane defined by a vertical valve centerline and a transversal valve centerline in the valve closing direction, and wherein the contact surface has a varying pitch, with a steeper pitch in the vicinity of the pair of bosses and a lesser pitch in the central portions between the pair of bosses, wherein said pitch extends from the semi-elliptic first contact/closure curve to the semi-elliptic edge.

2. The seat ring as claimed in claim 1, wherein the pair of bosses have flat sliding surfaces, and a curved/inclined surface extends from each flat sliding surface to an edge of the seat ring.

3. The seat ring as claimed in claim 1, wherein sealing of the valve disc in the seat ring increases while rotating the valve disc in a closing direction up to a fully closed position.

4. The seat ring as claimed in claim 1, wherein sealing of the valve disc in the seat ring occurs when the valve disc is at an angle of 6° with respect to perpendicular to a flow passage direction.

5. The seat ring as claimed in claim 4, wherein sealing of the valve disc in the seat ring increases as the valve disc rotates from at an angle of 6° with respect to perpendicular to a flow passage direction to a fully closed position at 0° with respect to perpendicular to a flow passage direction.

6. The seat ring as claimed in claim 4, wherein when the valve disc is at an angle of 6° with respect to perpendicular to a flow passage direction the periphery of the valve disc, along the entire circumference of the valve disc is simultaneously brought into contact with the semi-elliptic first contact/closure curve.

7. A butterfly valve, comprising:
a valve body;
a valve disc having a substantially circular outer circumference and a diameter;
one or more valve stems supporting the valve disc;
a seat ring having a radially inwardly protruding continuous circumferential sealing projection located between a pair of bosses surrounding valve stem holes, the sealing projection having a varying cross-sectional shape and comprising a contact surface and an adjacent semi-elliptic surface, wherein the semi-elliptic surface has a smallest inner diameter smaller than the diameter of the valve disc, and the contact surface is a tapered surface;
wherein the contact surface comprises a semi-elliptic first contact/closure curve, the semi-elliptic first contact/closure curve being inclined towards a valve disc opening direction at a central portion between the pair of bosses and swelling away from a semi-elliptic edge connecting the contact surface and the adjacent semi-elliptic surface,
wherein the semi-elliptic edge is positioned an offset distance from a plane defined by a vertical valve centerline and a transversal valve centerline in the valve closing direction; and
wherein the contact surface has a varying pitch, with a steeper pitch in the vicinity of the pair of bosses and a lesser pitch in the central portion between the pair of bosses, wherein said pitch extends from the semi-elliptic first contact/closure curve to the semi-elliptic edge.

8. The butterfly valve as claimed in claim 7, wherein the pair of bosses have flat sliding surfaces, and a curved/inclined surface extends from each flat sliding surface to an edge of the seat ring.

9. The butterfly valve as claimed in claim 8, wherein sealing of the valve disc in the seat ring increases while rotating the valve disc in a closing direction up to a fully closed position.

10. The butterfly valve as claimed in claim 9, wherein sealing of the valve disc in the seat ring occurs when the valve disc is at an angle of 6° with respect to perpendicular to a flow passage direction.

11. The butterfly valve as claimed in claim 10, wherein sealing of the valve disc in the seat ring increases as the valve disc rotates from at an angle of 6° with respect to perpendicular to a flow passage direction to a fully closed position at 0° with respect to perpendicular to a flow passage direction.

12. The butterfly valve as claimed in claim 10, wherein when the valve disc is at an angle of 6° with respect to perpendicular to a flow passage direction the periphery of the valve disc, the entire circumference of the valve disc is simultaneously brought into contact with the semi-elliptic first contact/closure curve.

* * * * *